United States Patent
Allahut et al.

(10) Patent No.: US 9,430,013 B2
(45) Date of Patent: Aug. 30, 2016

(54) ELECTRICAL INSTALLATION HAVING AN UNINTERRUPTIBLE POWER SUPPLY

(71) Applicant: Siemens Aktiengesellschaft, Munich (DE)

(72) Inventors: Gerd Allahut, Greding (DE); Hans-Klaus Schmidt, Langenzenn (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 14/542,162

(22) Filed: Nov. 14, 2014

(65) Prior Publication Data
US 2015/0149821 A1 May 28, 2015

(30) Foreign Application Priority Data
Nov. 22, 2013 (EP) .................................... 13194042

(51) Int. Cl.
| G06F 11/00 | (2006.01) |
|---|---|
| G06F 1/30 | (2006.01) |
| G06F 11/20 | (2006.01) |
| H02J 9/06 | (2006.01) |
| H02J 13/00 | (2006.01) |

(52) U.S. Cl.
CPC .............. *G06F 1/30* (2013.01); *G06F 11/2015* (2013.01); *H02J 9/061* (2013.01); *H02J 13/0062* (2013.01); *Y02B 70/3291* (2013.01); *Y02B 90/222* (2013.01); *Y02B 90/2638* (2013.01); *Y04S 20/12* (2013.01); *Y04S 20/248* (2013.01); *Y04S 40/124* (2013.01)

(58) Field of Classification Search
CPC .............................. G06F 11/215; G06F 11/30
USPC .................................. 714/14, 15, 11, 12, 13
See application file for complete search history.

(56) References Cited

U.S. PATENT DOCUMENTS

| 5,734,230 | A | | 3/1998 | Edwards et al. |
|---|---|---|---|---|
| 5,964,609 | A | * | 10/1999 | Wilson ................... H01R 13/64 439/215 |
| 5,994,794 | A | * | 11/1999 | Wehrlen ................. H02J 9/066 307/64 |
| 6,433,444 | B1 | * | 8/2002 | de Vries .................... H02J 1/10 307/64 |
| 7,478,251 | B1 | * | 1/2009 | Diab ....................... G06F 1/189 307/38 |
| 2002/0079877 | A1 | | 6/2002 | Hammer et al. |
| 2007/0168088 | A1 | * | 7/2007 | Ewing ....................... H02J 3/14 700/295 |
| 2007/0200434 | A1 | * | 8/2007 | Gottlieb ............ G01R 31/3648 307/66 |
| 2009/0251002 | A1 | | 10/2009 | Cohen et al. |
| 2010/0289335 | A1 | * | 11/2010 | Togare ...................... H02J 1/10 307/65 |
| 2013/0124000 | A1 | | 5/2013 | Matsumoto et al. |
| 2013/0169046 | A1 | | 7/2013 | Shin et al. |

FOREIGN PATENT DOCUMENTS

EP          1 223 656          7/2002

* cited by examiner

*Primary Examiner* — Dieu-Minh Le
(74) *Attorney, Agent, or Firm* — Cozen O'Connor

(57) ABSTRACT

An electrically operated installation and method has a plurality of electrical loads, in which the event of a failure of a basic supply voltage the electrical loads are supplied by a backup voltage, wherein a power supply unit exchanges data with several loads via a field bus, the loads each have a software module for communication via the field bus, a software module of a load is configured as a master and the software modules of the other loads are configured as slaves, the power supply unit as a communication partner of the master controls a regulated shutdown procedure of the loads, in the event of a failure of the basic supply voltage the power supply unit reports this to the master via the field bus, and the master and the software modules of the loads perform the shutdown procedure in configurable synchronization stages.

9 Claims, 4 Drawing Sheets

ELECTRICAL INSTALLATION HAVING AN UNINTERRUPTIBLE POWER SUPPLY

BACKGROUND OF THE INVENTION

1. Field of the Invention

The invention relates to a method for operating an electrical installation having a plurality of electrical loads which are connected to a basic supply voltage and, in the event of a failure of the basic supply voltage, are connected to a backup voltage, in order to safeguard the supply to the electrical loads for a duration of a backup phase, the backup voltage being provided by means of an uninterruptible power supply unit.

The invention also relates to an electrically driven installation for performing the method.

2. Description of the Related Art

Within installations having an uninterruptible power supply unit it has until now been customary for the uninterruptible power supply unit to shut down its power output after a preconfigured time.

However, the following problems result: the installation, the installation component or the user cannot prepare for the shutdown. Moreover, important interdependencies of the users are not taken into account.

Even an uninterruptible power supply unit that implements a particular shutdown management plan using specific functional modules cannot fully resolve complex dependencies among the users. Inconsistencies and data losses occur when preparing for the impending shutdown. Furthermore, even when the voltage is restored in backup operation the installation cannot continue to be operated problem-free, and thus downtimes occur.

An uninterruptible power supply for a web press is known from EP 1 223 656 A1, in which in the event of a disruption to the supply voltage a control sequence can be triggered, according to which the web press can be brought to a standard defined production halt. In the case of the electrical installation according to EP 1 223 656 A1 there is only one electrical load, namely the web press, which is directly connected to the uninterruptible power supply.

In an electrical installation with a plurality of electrical loads, which can readily be arranged on a decentralized basis in an industrial process, it is disadvantageous that the individual electrical load cannot prepare itself for the impending shutdown in the event of the basic supply voltage failing. As a result, there is a risk of data losses, undefined installation states and damage to workpieces and the installation, because a process or subprocess in progress is abruptly interrupted because of an uncoordinated shutdown.

SUMMARY OF THE INVENTION

It is therefore an object of the invention to provide an improved method and installation for the performance of the method such that also several machines, in other words a plurality of electrical loads, can also be brought into a safe state in the event of a failure of the basic supply voltage, taking into account the limited amount of stored energy available in the uninterruptible power supply unit.

This and other objects and advantages are achieved in accordance with the invention by a method in which the uninterruptible power supply unit is connected to the plurality of electrical loads via a field bus in order to exchange data, the plurality of electrical loads are each provided with a software module which is integrated into the communication via the field bus, the software module of at least one load is implemented as a master and the software modules of the other loads are implemented as slaves in the context of master-slave communication, the master is established in the power supply unit as a communication partner for performance of a regulated shutdown procedure for the electrical loads, in the event of a failure of the basic supply voltage the power supply unit notifies the master of the failure via the field bus and as a result the regulated shutdown procedure is launched, the shutdown procedure occurs in configurable synchronization stages, for each synchronization stage the software module, for each load, stores whether the load should maintain or change its energy state and, if several energy state changes are possible and provided for, to which energy state it should change, the master signals each synchronization stage to the loads consecutively, the energy state changes of the loads stored in the software modules are executed for the respective synchronization stage and after execution the corresponding software module reports this to the master.

Using an uninterruptible power supply unit for an electrical installation which can communicate via a field bus a regulated shutdown procedure can be implemented via software modules installed locally in the electrical loads. Via these software modules, which are integrated into the communication via the field bus, the uninterruptible power supply unit can be integrated into an electrical installation by way of a data communications link such that the electrical loads, such as control components, programmable logic controllers or control systems, can take an occurrence of the failure of the basic supply voltage into account in good time. If the uninterruptible power supply unit switches from normal operation to operation in which a backup voltage is provided, the uninterruptible power supply unit can provide the backup voltage only for a certain duration of a backup phase. Using the software modules installed in the electrical loads and the signaling of the failure of the basic supply voltage by the uninterruptible power supply unit, the electrical loads can prepare themselves at an early stage for an impending shutdown based on the uninterruptible power supply switching from normal operation to backup operation.

By using shutdown management with synchronization stages, dependencies in a complex installation/installation components and complex dependencies between the individual users or loads and their internal processes can be resolved/mapped and taken into account when preparing for an impending shutdown. Inconsistencies and data losses are ruled out.

In an advantageous embodiment, the method is improved in that the master supplies a user list and the loads are entered into the user list via their software modules appointed as slaves.

Advantageously the master supplies an empty user list, all software modules parameterized as slaves report their relevant information to the master, and the user list is completed with information about addresses, device types, energy or consumption, durations.

In particular for the operation of an electrical installation in conjunction with an industrially automated electrical installation, devices from the following groups are used as electrical loads: programmable logic controllers, operator control and monitoring systems, industrial or personal computers.

It is also an object of the invention to provide an electrically operated installation for the performance of the method with a plurality of electrical loads that are connected to a basic supply voltage. In this case, an uninterruptible power supply unit is present that is configured, in the event of a failure in the basic supply voltage, to actuate a backup voltage to the electrical loads, in order to safeguard the supply to the electrical loads for a duration of a backup phase, where the power supply unit is configured to exchange data via a field bus with the plurality of electrical loads, where the plurality of electrical loads each have a software module which is configured to communicate via a field bus, and where the software module of at least one load is configured as a master and the software modules of the other loads are configured as slaves in the context of master-slave communication. Here the power supply unit is configured as a communication partner of the master for performance of a regulated shutdown procedure of the electrical loads. Furthermore, the power supply unit is configured, in the event of a failure of the basic supply voltage, to notify this failure to the master via the field bus.

The master and the software modules of the loads are configured to perform the shutdown procedure in configurable synchronization stages. For each synchronization stage, the software module of each load stores whether the load should maintain or change its energy state and, if several energy state changes are possible and provided for, to which energy state it should change. In addition, the master is configured to signal each synchronization stage consecutively to the loads.

The loads are configured to execute the energy state change stored in the software modules for the respective synchronization stages and the software modules are configured, after execution of the energy state change for the respective synchronization stage, to report this to the master.

In order to take account of the individual needs of each electrical load, the master has a user list and the loads are configured, by their software modules appointed as slaves, to enter themselves into the user list. Preferably, information about addresses, device types, energy consumption, periods of time or information about a powerdown is entered in the user list.

In order to facilitate the work and the configuration at the electrical installation for a commissioning engineer, the power supply unit, the electrical loads and the software modules are configured such that they can be parameterized using a software tool.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment, in which.

DETAILED DESCRIPTION OF THE PREFERRED EMBODIMENTS

Figure 1:
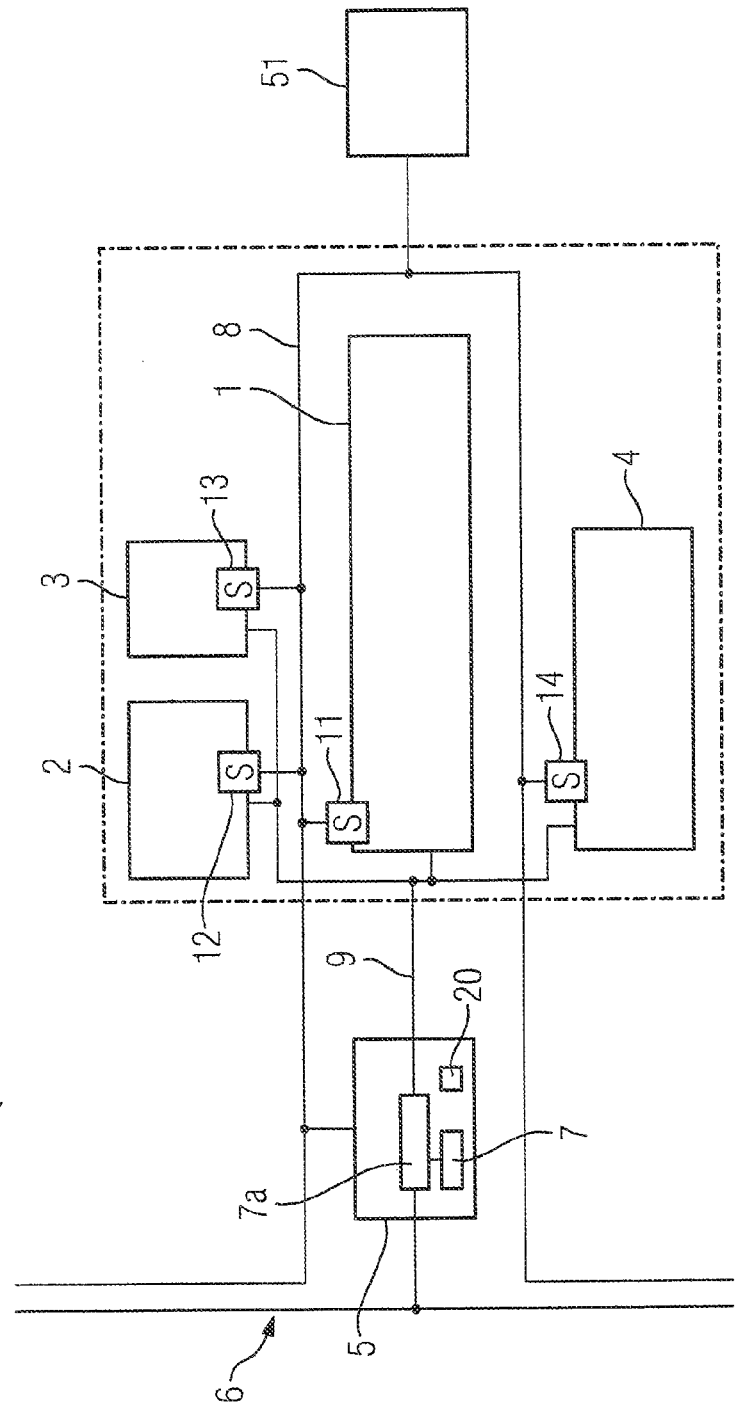
FIG. 1 shows an electrical installation having electrical loads and an uninterruptible power supply unit, where the electrical loads are provided with a software module in accordance with the invention.

According to FIG. 1, an electrically operated installation 50 with a plurality of electrical loads 1,2,3,4 is illustrated. A first load 1 is configured as an industrial PC with process control software, an archive, a license module and a Word program; a second load 2 is configured as an industrial HMI panel for operating and monitoring a process; a third load 3 is configured as a programmable logic controller for controlling a subprocess; and a fourth load 4 is configured as a control system industrial PC with an operator control and monitoring program and a software-aided programmable logic controller.

The loads 1,2,3,4 are connected to an uninterruptible power supply unit 5 via a voltage supply line 9. The uninterruptible power supply unit 5 receives a basic supply voltage 6 via a 24V supply line. This basic supply voltage 6 is in normal operation connected to the electrical loads 1,2,3,4 via a changeover facility 7a. In the event of the basic supply voltage 6 failing, the uninterruptible power supply unit 5 is configured to switch, via the changeover facility 7a, to a battery module with a backup voltage 7 and to supply the electrical loads 1,2,3,4, with the backup voltage 7 via the voltage supply line 9.

Consequently, if the basic supply voltage 6 fails, the backup voltage 7 to the electrical loads 1,2,3,4 is turned on, to ensure that the electrical loads are supplied for a duration of the backup phase.

Depending on the capacity of the battery module of the uninterruptible power supply unit 5 and the consumption figures for the electrical loads, a stored energy time 20 may last from between 20 seconds and a few minutes. In other words, during the stored energy time 20 the electrical loads can continue to work normally, although backup operation is in effect. If the basic supply voltage 6 is not restored within the stored energy time 20 a controlled shutdown procedure for the individual electrical loads 1,2,3,4 is launched via software modules 11,12,13,14 installed in the electrical loads 1,2,3,4. To this end the first load 1 has a first software module 11, the second load 2 has a second software module 12, the third load 3 has a third software module 13 and the fourth load 4 has a fourth software module 14.

The software modules 11,12,13,14 are parameterized with an individual shutdown sequence in respect of their loads 1,2,3,4. This parameterization can be effected using a software tool 51 which, as with the software modules 11,12,13,14, is connected to a field bus 8.

Figure 2:
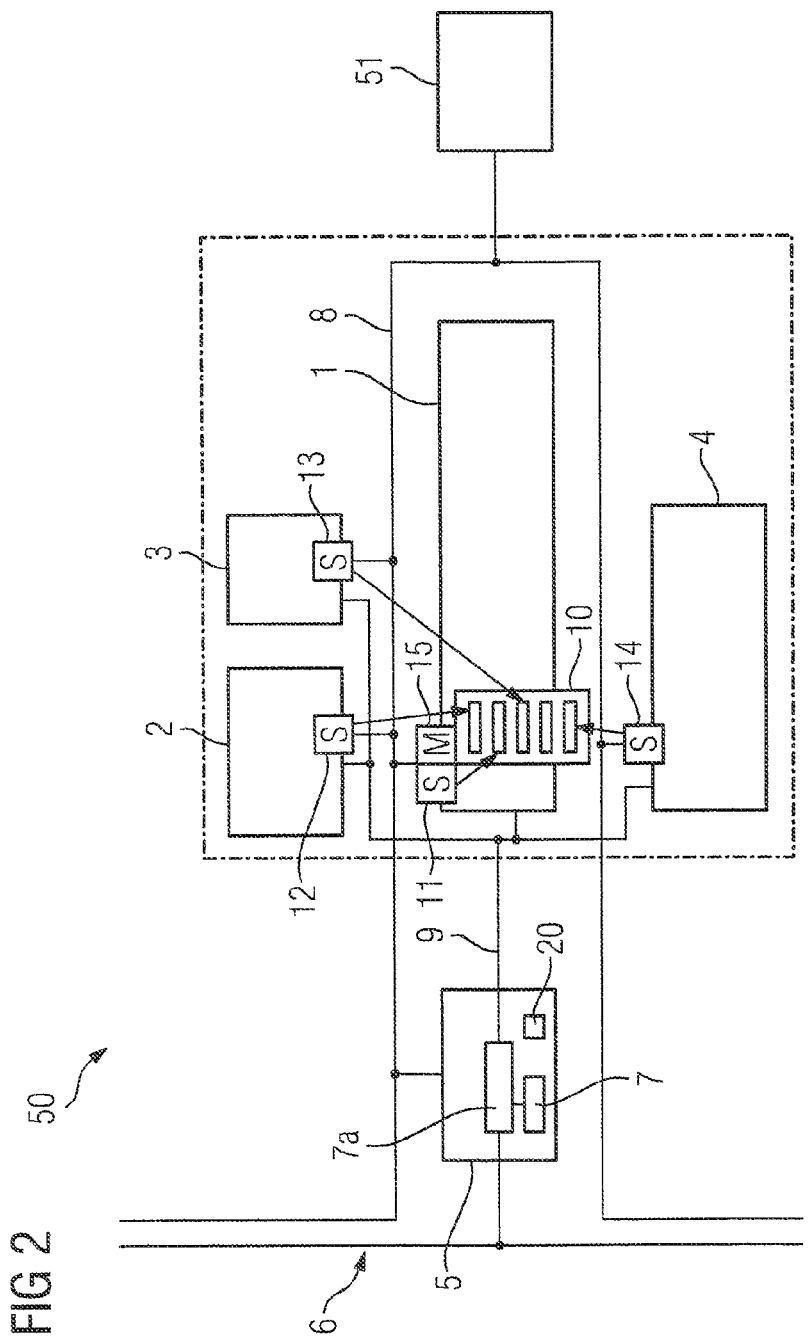
FIG. 2 shows the electrical installation of FIG. 1, where an electrical load additionally has a software module configured as a master in accordance with the invention.

According to FIG. 2 a specific electrical load, namely the first load 1, is additionally or in combination given a separate software module, namely a fifth software module 15, which is configured as a master M in the context of master-slave communication, with the software modules 11,12,13,14 being configured as slaves S to the master M.

The master M has a user list 10, where the loads 1,2,3,4 are configured, via their software modules 11,12,13,14 appointed as slaves S, to enter themselves in the user list 10. The master M is configured to provide data traffic between the uninterruptible power supply unit 5 and itself. Consequently the master M is able to request or accept data from the uninterruptible power supply unit 5 and to process it. In the master-slave communication configuration of the electrical installation 50 the master M controls the software modules 11,12,13 in the loads 1,2,3,4.

The stored energy time 20 is stored in the uninterruptible power supply unit 5, with the master M being configured to interrogate the stored energy time 20 and being additionally configured, on commencement of the failure of the basic supply voltage 6, about which it is notified by a signal from the uninterruptible power supply unit 5, to measure how long the failure has already lasted and in the event that the failure lasts longer than the stored energy time the master is configured to send the slaves S a command to launch their respective individual shutdown sequence.

In order to perform the shutdown procedure in a coordinated manner in the context of shutdown management, the master is configured to monitor the individual shutdown sequences via the user list 10 and after the individual shutdown sequences have been successfully performed to launch its own shutdown sequence, which is in turn implemented in the first software module 11 in addition to the master M, where the master notifies the launch of its own shutdown sequence in turn to the uninterruptible power supply unit 5, which then shuts down the backup voltage on termination of the shutdown sequence of the first software module 11. After this coordinated powerdown of all electrical loads 1,2,3,4 the electrical installation 50 is in a defined, safe state.

The method or the software modules 11,12,13,14 are configured or can be parameterized such that a time-controlled shutdown, an energy-controlled shutdown or a shutdown in accordance with synchronization stages can be selected for the shutdown procedure.

The software modules in the form of a master M can advantageously occur in two variants, namely for example for a Microsoft Windows PC as a software application or for example for a programmable logic controller as a function module.

The software modules in their function as slaves can likewise occur as a Microsoft Windows PC software application, as a function module for programmable logic controllers or as a Microsoft Windows CE software application, for example for HMI panels.

The software modules will be designated as agents below and advantageously have a user interface that can be operated using the software tool 51.

Agents that are installed on a PC system or on an HMI panel consequently report to an operator of the electrical installation 50 as a self-explanatory user interface. In this case, a distinction is made between a user interface of the master agent and a user interface of a slave agent.

The user interface of the master agent offers a facility for selecting between the time-controlled and the energy-controlled shutdown. When the time-controlled shutdown is selected the user interface offers further setting options, such as a time until launch of the shutdown phase. When the energy-controlled shutdown is selected, the user interface offers input options for the amount of energy that is used in the shutdown phase by the installation component or electrical load. The selection facility in the user interface also makes it possible to subdivide the shutdown phases into synchronization stages. A representation of the user list 10 that is managed by the master agent is still provided in the user interface. In this case, the data transmitted by the slave agent is, however, only displayed as read-only.

A user interface of the slave agents offers a selection of a file (generally a .bat or .exe file) which on commencement of the backup operation (i.e., the commencement of the transition phase) is to be executed on the electrical load. A file can also be selected that is to be executed on the electrical load on commencement of the shutdown phase. If the "Subdivision of the shutdown phase into synchronization stages" option is selected in the user interface in accordance with the present invention an editable 16-line table is displayed. The 16 lines symbolize the maximum number of synchronization stages. The operator of the electrical installation can make entries in the individual lines about files and timeouts to be executed.

For an energy-controlled shutdown procedure two cases are distinguished:

1. In general, the shutdown procedure should only be initiated at the very last moment, i.e., when the energy content of the battery module corresponds to the energy that the electrical loads need in order to power down safely. The larger the installation operator measures a capacity of a battery to be, the longer the transition phase can be omitted and vice versa. The transition phase can be used for the normal continued operation of the electrical installation.
2. System operators also exist who wish to use the stored energy phase for the normal operation of the backed-up installation component and in the event of the voltage being restored in the interim would like not to initiate a shutdown phase.

If an operator has decided on the second case, in other words the case in which an electrical installation should continue to work normally for as long as possible after the basic supply voltage 9 has failed and in fact for as long as the energy store of the uninterruptible power supply unit permits—the operator really only wants the electrical load to power down when the energy remaining in the battery module is only still sufficient to power down the individual electrical loads reliably and the basic supply voltage 6 has not been restored. For this, the operator of the electrical installation 50 must determine in advance the energy consumption in the shutdown phase for each electrical load. Using the determined or calculated figures the operator finds the minimum size of the capacity of the battery module that would still just be sufficient for an installation component in question or for the electrical installation to power it down safely.

Figure 3:
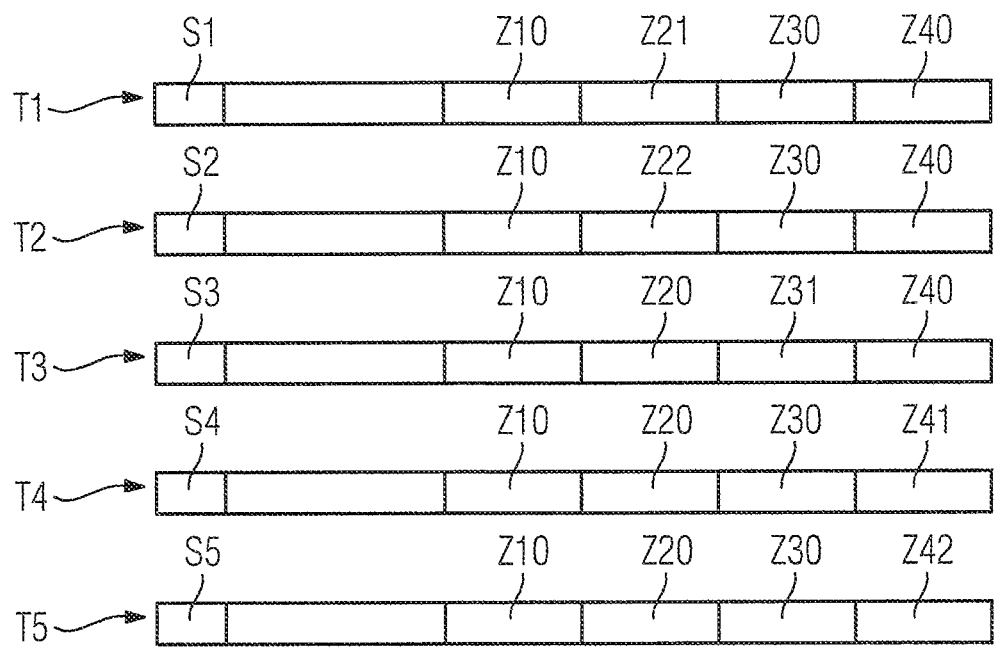
FIG. 3 shows an exemplary sequence of a shutdown procedure of several loads in synchronization stages in accordance with the invention.

FIG. 3 shows an exemplary sequence of a shutdown procedure in configurable synchronization stages. In this example, five synchronization stages S1,S2,S3,S4 and S5 are set specifically, for each of which a particular duration T1,T2,T3,T4 and T5 is predetermined in accordance with the duration of the actions.

For each of the synchronization stages S1,S2,S3,S4 and S5, information as to whether the load 1,2,3 or 4 is to maintain or change its energy state is stored for each of the loads 1,2,3,4 in its respective software module 11,12,13 or 14. Z10 means that the load 1 should not change its energy state. If, for example, the load 2 has just the two energy states ON and OFF, only one state change Z21 has to be taken into consideration for the shutdown, where the FIG. 2 stands for the load and the FIG. 1 for the first and only state change. A second state change of the load 3 is symbolized by Z32.

The master M signals each synchronization stage to the loads 1,2,3,4 individually, starting with synchronization stage 1, for which the duration T1 is predetermined. Thereupon, the energy states ZXX of the loads 1,2,3,4 which are stored in the associated software modules 11,12,13 and 14 are executed for the synchronization stage 1.

Once this state change ZXX has been performed, the corresponding software module 11,12,13,14 reports this to the master M in acknowledgement.

Once the master M has received the acknowledgement from all loads 1,2,3,4 or else no later than on expiration of the duration T1, the next synchronization stage is signaled by the master M.

The signal "Shutdown achieved" is sent to the master M by the slaves that are located on users or loads without an operating system. This is noted in the user list. If the voltage is restored it is still possible if appropriate to return to normal operation.

The last synchronization stage relates, for example, to the operating system, such as the termination of the operating system on the lower PC, i.e., in the load 4 according to FIG. 1.

Furthermore, even if the voltage is restored in backup operation the installation can be returned to normal operation, in that the control program—as a function of the synchronization stages passed through—causes the installation to be powered up again and normal operation to be restored. Downtimes are thus completely prevented, since the preparation process for the impending shutdown is aborted.

Last but not least, a particular synchronization threshold can be designated as a "point of no return" via the specific function module. If this synchronization threshold is signaled to the users, the full preparation process for the impending shutdown has to be performed, since the installation can no longer readily be set to normal operation. This may be the case, for example, if just one PC system is powered down, without which the installation cannot be operated normally. The designation "point of no return" thus also contributes to safety.

The functionality of the specific function modules can also be implemented as (PC) software.

Figure 4:
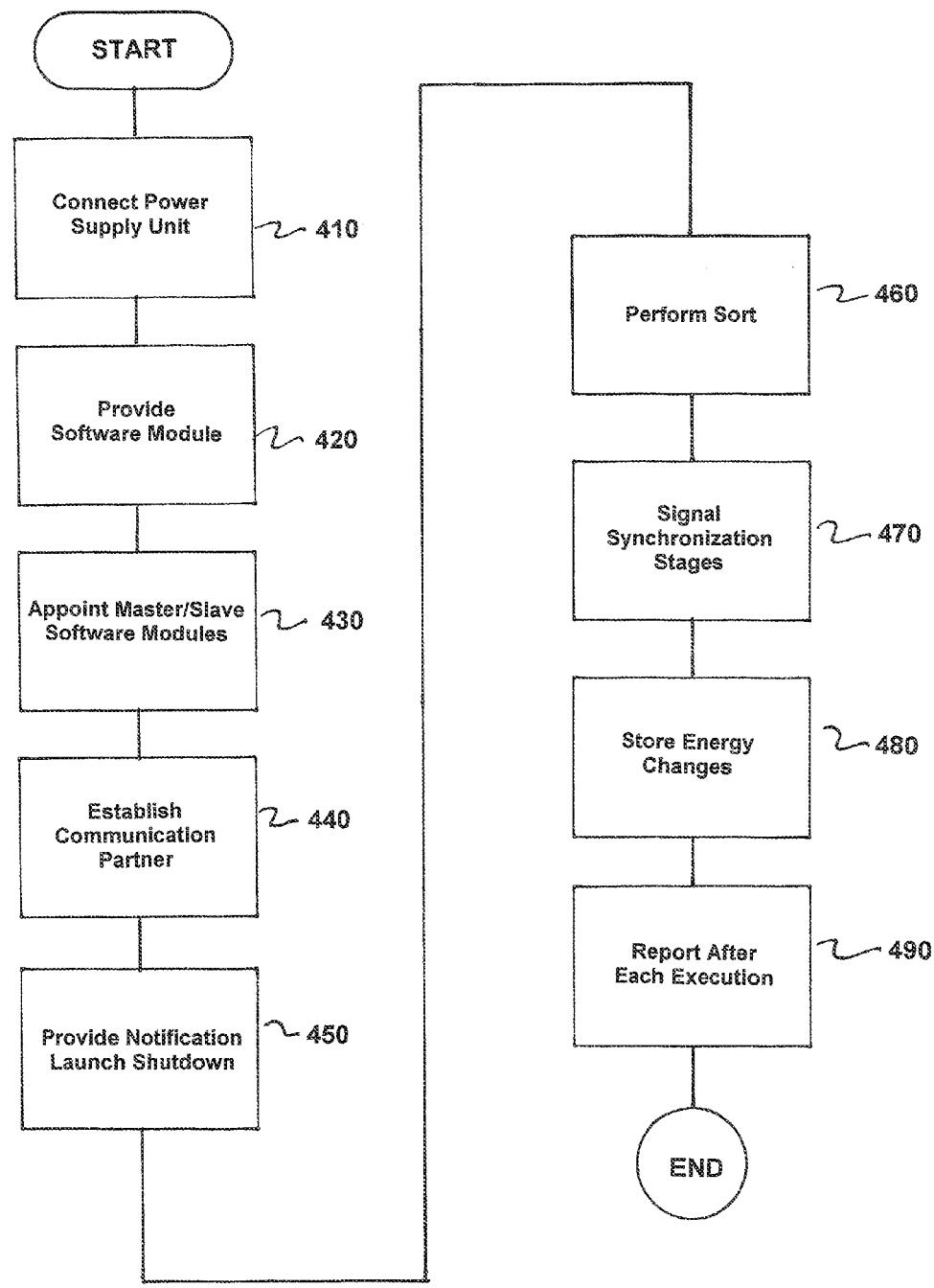
FIG. 4 is a flowchart of the method in accordance with the invention.

FIG. 4 is a flowchart of a method for operating an electrical installation (50) having a plurality of electrical loads (1,2,3,4) which are connected to a basic supply voltage (6) and, in an event of the basic supply voltage (6) failing, are connected to a backup voltage (7), in order to safeguard the supply to the electrical loads (1,2,3,4) for a duration of a backup phase, where the backup voltage (7) is provided via an uninterruptible power supply unit (5).

The method comprises connecting the power supply unit (5) to the plurality of electrical loads (1,2,3,4) via a field bus (8) to exchange data, as indicated in step 410.

Next, each of the plurality of electrical loads (1,2,3,4) are provided with a software module (11,12,13,14,15) that is integrated into communication via the field bus (8), as indicated in step 420.

The software module (15) of at least one load (1) of the plurality of electrical loads is now appointed as a master (M) and other software modules (11,12,13,14) of other loads (2,3,4) of the plurality of electrical loads as slaves (S) within a context of master-slave communication, as indicated in step 430.

Next, a master (M) is established in the power supply unit (5) as a communication partner for performance of a regulated shutdown procedure of the plurality of electrical loads (1,2,3,4), as indicated in step 440.

In the event of a failure of the basic supply voltage (6), a notification is provided from the power supply unit (5) to the master (M) of the failure via the field bus (8) and a regulated shutdown procedure is launched as a result of the failure, as indicated in step 450. Here, the shutdown procedure occurs in configurable synchronization stages (S1,S2,S3,S4, S5 . . . ).

A relevant software module (11,12,13,14) now sorts, for each load of the plurality of loads (1,2,3,4), whether the load should maintain or change its energy state for each of the configurable synchronization stages (S1,S2,S3,S4,S5 . . . ) and, if several energy state changes (ZXX) are possible and provided for, to which energy state the load should change, as indicated in step 460.

Next, the master (M) signals each of the synchronization stages (S1,S2,S3,S4,S5 . . . ) consecutively to the plurality of loads (1,2,3,4), as indicated in step 470.

The energy state changes (ZXX) of the plurality of loads (1,2,3,4) stored in the software modules (11,12,13,14) for the respective synchronization stage (S1,S2,S3,S4, S5 . . . ) are now executed, as indicated in step 480.

A corresponding software module (11,12,13,14) then reports after each execution to the master, as indicated in step 490.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an electrical installation having a plurality of electrical loads which are connected to a basic supply voltage and, in an event of the basic supply voltage failing, are connected to a backup voltage, in order to safeguard the supply to the electrical loads for a duration of a backup phase, the backup voltage being provided via an uninterruptible power supply unit, the method comprising:

connecting the power supply unit to the plurality of electrical loads via a field bus to exchange data;

providing each of the plurality of electrical loads with a software module which is integrated into communication via the field bus;

appointing the software module of at least one load of the plurality of electrical loads as a master and other software modules of other loads of the plurality of electrical loads as slaves within a context of master-slave communication;

establishing a master in the power supply unit as a communication partner for performance of a regulated shutdown procedure of the plurality of electrical loads;

providing, in an event of a failure of the basic supply voltage a notification from the power supply unit to the master of said failure via the field bus and launching a regulated shutdown procedure as a result of the failure, the shutdown procedure occurring in configurable synchronization stages;

storing, by a relevant software module for each load of the plurality of loads, whether the load should maintain or change its energy state for each of the configurable synchronization stages and, if several energy state changes are possible and provided for, to which energy state the load should change;

signaling, by the master, each of the synchronization stages consecutively to the plurality of loads;

executing the energy state changes of the plurality of loads stored in the software modules for the respective synchronization stage; and reporting, by a corresponding software module, after each execution to the master.

2. The method as claimed in claim 1, wherein a respective next synchronization stage is signaled by the master one of (i) on conclusion of a duration of a preceding synchronization stage and (ii) after all loads have reported execution of the state change to the master in acknowledgement.

3. The method as claimed in claim 1, wherein the master makes available a user list and the loads are entered in the user list via their software modules appointed as slaves.

4. The method as claimed in claim 2, wherein the master makes available a user list and the loads are entered in the user list via their software modules appointed as slaves.

5. The method as claimed in claim 1, wherein devices from the following group are used as electrical loads programmable logic controllers, operator control and monitoring systems, industrial or personal computers.

6. An electrically operated installation, comprising:

a plurality of electrical loads which are connected to a basic supply voltage; and an uninterruptible power supply unit configured, in an event of a failure of the basic supply voltage, to actuate a backup voltage to the plurality of electrical loads to safeguard the supply to the electrical loads for a duration of a backup phase;

wherein the power supply unit is configured to exchange data with the plurality of electrical loads via a field bus;

wherein the plurality of electrical loads each have a software module which is configured to communicate via the field bus;

wherein a software module of at least one electrical load of the plurality of electrical loads is configured as a master and software modules of other loads of the plurality of electrical loads are configured as slaves in a context of master-slave communication;

wherein the power supply unit is configured as a communication partner of the master for performance of a regulated shutdown procedure of the plurality of electrical loads;

wherein the power supply unit is configured, in an event of a failure of the basic supply voltage, to notify said failure to the master via the field bus;

wherein the master and the software modules of the plurality of electrical loads are configured to perform the shutdown procedure in configurable synchronization stages;

wherein for each synchronization stage the software module, for each load of the plurality of electrical loads stores whether the load of the plurality of electrical loads should maintain or change its energy state and, if several energy state changes are possible and provided for, to which energy state the load should change;

wherein the master is configured to signal each synchronization stage consecutively to the plurality of electrical loads;

wherein the plurality of electrical loads are configured to execute the energy state changes stored in the software modules for the respective synchronization stage; and wherein the software modules are configured, after execution of the energy state changes for the respective synchronization stage, to report to the master.

7. The electrically operated installation as claimed in claim 6, wherein the master has a user list and the loads are configured, by means of their software modules appointed as slaves, to enter themselves in the user list.

8. The electrically operated installation according to claim 6, wherein the power supply unit, the electrical loads and the software modules are configured such that they can be parameterized using a software tool.

9. The electrically operated installation according to claim 7, wherein the power supply unit, the electrical loads and the software modules are configured such that they can be parameterized using a software tool.

* * * * *